United States Patent [19]
Robins

[11] 3,935,673
[45] Feb. 3, 1976

[54] PRODUCTION OF BELGIUM ENDIVE

[76] Inventor: Sy Raymond Robins, 180 E. End Ave., New York, N.Y. 10028

[22] Filed: Sept. 21, 1973

[21] Appl. No.: 399,540

[52] U.S. Cl. ............................ 47/58; 47/1.1; 47/1.2
[51] Int. Cl.² ...................... A01G 9/20; A01G 31/00
[58] Field of Search .......................... 47/58, 1.1, 1.2

[56] References Cited
UNITED STATES PATENTS

| | | | |
|---|---|---|---|
| 1,749,134 | 3/1930 | Griswold | 47/1.1 X |
| 1,808,383 | 6/1931 | Steves | 47/1.1 |

FOREIGN PATENTS OR APPLICATIONS

| | | |
|---|---|---|
| 224,381 | 5/1943 | Switzerland |
| 225,111 | 4/1943 | Switzerland |

OTHER PUBLICATIONS

New Illus. Ency. of Gardening, Everett, Greystone Press, 1960, p. 384.

Taylor's Ency. of Gardening, Taylor, Houghton Mifflin Co., 1961, p. 206.

*Primary Examiner*—Robert E. Bagwill

[57] ABSTRACT

A technique for forcing the growth of Belgium endive in which roots grown in the field are placed in sterile growing media in pallet boxes stacked one above the other within a controlled-environment chamber whose available volume is fully utilized. In a production cycle, the growth of shoots from the roots is initiated by a start-up temperature in the range of 70° to 80°F, the temperature thereafter being reduced to the range of 52° to 56°F for the remainder of the forcing cycle. The relative humidity is maintained in the range of 70 percent to 85 percent. The roots are planted in a clean, sterile growing media so that in harvesting, when the shoot is cut from the root, it is clean and requires no washing.

9 Claims, 3 Drawing Figures

U.S. Patent   February 3, 1976   3,935,673
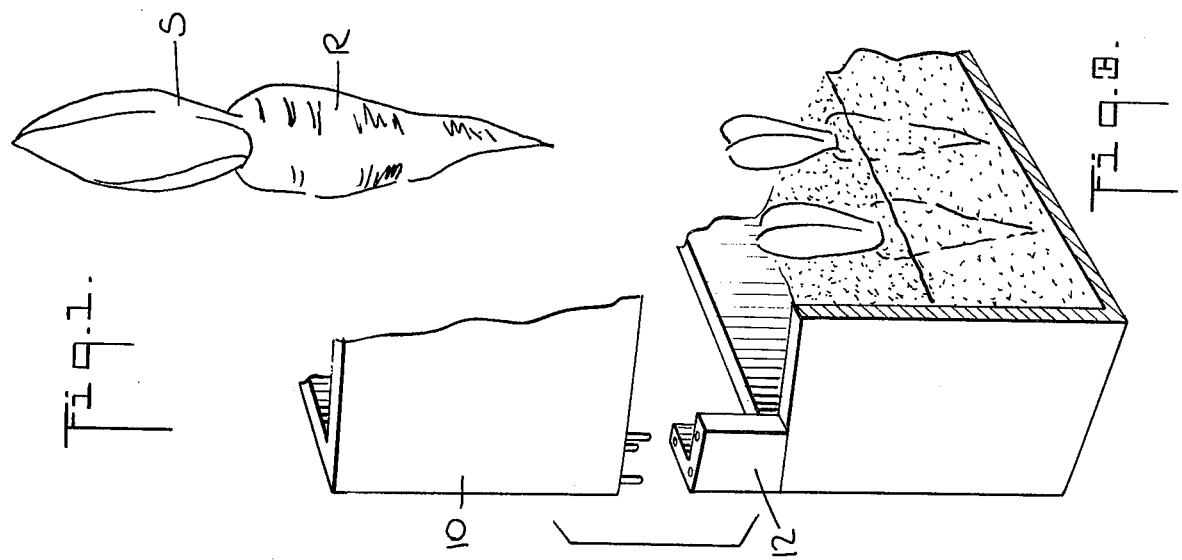
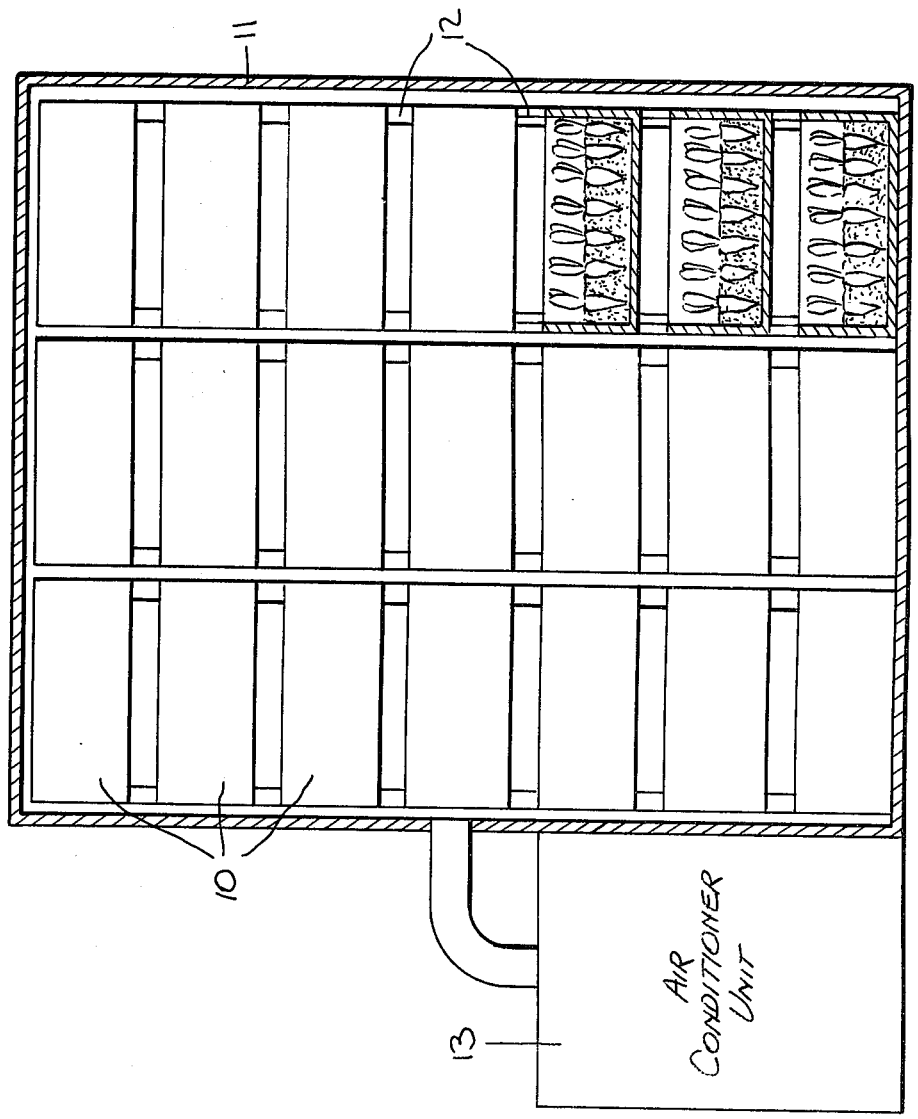

PRODUCTION OF BELGIUM ENDIVE

BACKGROUND OF THE INVENTION

This invention relates to a new technique for producing Belgium endive.

The term "endive" is indefinite, for it is loosely applied to two distinct types of chicory plants which are widely used in salads. The exclusive concern of the present invention is with Cichorium intybus or "wild chicory," commercially known as witloof or Belgium endive. This plant has a carrot-like root and deeply lobed and lacinated leaves. The other form of endive, often called escarole, has highly curled leaves.

Since this invention deals only with the first form, we shall hereinafter refer to it as "Belgium endive," particularly since the principal producing area for this plant is Belgium, although substantial amounts are grown in Holland, France and Canada. Currently there is little production of Belgium endive in the United States. One significant aspect of the present invention is that it now makes feasible low-cost production of Belgium endive in the United States and elsewhere, on a year-round basis.

The roots of Belgium endive are sometimes used as a coffee substitute or additive, but the interest of the present invention lies in the young growing shoot that develops in matured roots when subjected to forcing conditions. The culture of Belgium endive is divided into two distinct phases. In the first phase, mature roots are grown in the field using conventional agricultural practices similar to those entailed in carrot or parsnip production. Roots of Belgium endive grown out-of-doors are dug up, after which the tops are removed prior to storage. In some instances, the tops are cut off before the roots are dug up.

The second or forcing phase is started in early fall and is continued throughout the winter and spring months. This phase, as heretofore practiced, cannot be carried out in the summer, for the prevailing temperatures are then too high for forcing Belgium endive. Most forcing takes place in large sheds having a dirt floor, although in mild weather one can effect forcing out-of-doors in soil mounds.

The usual procedure in the forcing phase involves digging a trench across the shed approximately four feet wide and twelve to sixteen inches deep. The roots are then planted one against the other, basal end down, and covered with soil. This process is repeated until the entire floor area of the shed has been planted. In the forcing phase as heretofore practiced, a temperature of about 50° to 60° F is maintained in the shed, and the heads are ready for harvest in about 4 to 5 weeks.

In order to maintain a temperature in the range of about 50° to 60°F in the winter, it is normally necessary to heat the shed. But in the late spring and summer, when the atmospheric temperature rises above this range, production is halted, for it is not commercially feasible to air-condition a shed, particularly since it not only essential to maintain a prescribed temperature level, but it is also important to hold the relative humidity in the range of about 70 to 85 percent.

An excessively high temperature (i.e., above about 60°F) coupled with low humidity in the forcing phase gives rise to soft, open heads of Belgium endive. These are not commercially acceptable. But should the relative humidity fall below 70 per cent, then the shoots become dessicated and brown spots appear which impair the salability of the product. When, on the other hand, a relative humidity in excess of 85 percent prevails, the plant becomes susceptible to disease organisms.

When the growth of Belgium endive is forced in sheds using existing techniques, the following drawbacks are encountered:-

I. LIMITED PRODUCTION CAPACITY -

Because all roots are planted in the ground, the productive capacity of the shed is determined by the two-dimensional area of the ground plane and not by the total volume of the shed. Hence the productive capacity can only be increased by expanding the area occupied by the shed. Inevitably such expansion is expensive, for it involves greater land and building costs.

II. POOR ENVIRONMENTAL CONTROL -

As a practical matter, it is only feasible to control the temperature of a large shed unidirectionally by raising the interior temperature above ambient level. This precludes production during periods of the year when the prevailing temperature lies above the range necessary for the forcing phase. And since one cannot effectively control humidity in a large shed, the resultant quality of the product is subject to varying conditions of humidity. Thus, in the course of forcing, the relative humidity in the shed may not lie within the optimum range. The expense of air-conditioning a shed is prohibitive, for though the shed may be large, it is only the ground plane which is exploited, and the cost of airconditioning per pound of product becomes very high.

III. POST-PRODUCTION CLEANING -

Because roots of Belgium endive are buried below the level of the soil in the shed, it becomes necessary after harvesting the roots, to wash them to remove the soil. Improper washing degrades the quality of the product. In any event, the need to wash the shoots adds to the over-all cost of producing Belgium endive.

IV. SEASONAL PRODUCTION -

As indicated previously, one cannot with existing forcing techniques produce Belgium endive during warm and hot periods of the year, so that production is presently restricted to those countries having prolonged cool periods and even then, one cannot produce during the late spring and summer months.

V. HANDLING PROBLEMS -

With the existing techniques in which trenches must be dug in the shed and the roots buried in the soil, the various procedures dictate manual operations. Mechanization of these procedures to reduce operating costs is not practical.

SUMMARY OF THE INVENTION

In view of the foregoing, it is the main object of this invention to provide a technique for forcing Belgium endive in a controlled environment wherein temperature and relative humidity are maintained within narrow ranges conducive to the growth of a high-quality product within a relatively short period.

More particularly, it is an object of this invention to provide a multi-tier technique for forcing Belgium endive in a relatively small controlled environment chamber whose volume is fully utilized, whereby a high productive output is realized within a compact area.

Also an object of this invention is to provide a forcing technique in which the roots are planted within a clean, sterile growing media, whereby the resultant shoots which are snapped off the roots, are clean, thereby obviating a post-production washing procedure and its attendant disadvantages.

Yet another object of the invention is to provide a forcing technique in which the roots are placed in a clean, sterile growing media in pallet boxes rather than soil, production being carried out by means of conveyor belts, fork-lift trucks and modern dumping equipment, thereby eliminating much of the hand labor inherent in present production practices.

Briefly stated, these objects are attained in a production technique for forcing Belgium endive, in which roots are planted in a clean, sterile growing media contained in pallet boxes. The pallet boxes are stacked one above the other from floor to ceiling in a small, air-conditioned dark chamber, with sufficient headroom between boxes to afford space for the developing shoots.

The atmosphere within the chamber is regulated in the course of a forcing cycle to maintain a relative humidity in the range of about 70 to 85 percent. The temperature at the start of the cycle is maintained for a few days in the range of about 70° to 80° F to stimulate the initial growth of the shoots, after which the temperature is reduced and maintained within a range of 52° to 56° F for the remainder of the cycle. Because the initial growth of the shoots is stimulated, the total forcing time is substantially reduced as compared to the 4 to 5 weeks heretofore required before the shoots were ready for harvesting.

For a better understanding of the invention as well as other objects and further features thereof, reference is made to the following detailed description to be read in conjunction with the accompanying drawings, wherein:

FIG. 1 is a sketch showing a typical Belgium endive plant;

FIG. 2 is a schematic illustration of a production facility for carrying out a forcing technique for Belgium endive, in accordance with the invention; and FIG. 3 shows in section the position of the roots in a pallet box.

DESCRIPTION OF THE INVENTION

Referring now to FIG. 1 of the drawing, there is shown a typical Belgium endive plant constituted by a root R and a shoot S. In the culture of Belgium endive, the roots are grown out-of-doors in the usual manner, and when the roots have matured, they are dug up, the tops thereof are removed, and the roots are stored preparatory to the second or forcing phase. Alternatively, the tops may be removed before the roots are dug up. Thus the first phase is unchanged.

In carrying out the forcing phase in accordance with the invention, the roots are planted in pallet boxes 10, as shown in FIG. 2, which are stacked one above the other within a controlled environment chamber 11. Stacking is effected by means of a spacer legs 12 which are interposed between the top corners of the box thereabove to provide for the circulation of the air-conditioned atmosphere. As many rows of stacked boxes are provided as will fill the available volume of the chamber, thereby fully utilizing the available space. Alternatively the pallets may be stacked on multiple tier racks.

In practice, the dimensions of the boxes may be approximately 4 feet by 4 feet in length and width, and 18 to 24 inches in height. The legs which lock the stacked boxes together are long enough to give about 3 inches of headroom above the growing-media in the box to allow for circulation of the conditioned air.

Associated with chamber 11 is an air-conditioning unit 13 adapted to maintain optimum conditions of relative humidity and temperature within certain ranges, to be later disclosed.

Each box is about partially filled with growing media 14. The media is composed of a reusable material such as shredded polyurethane foam, Perlite, or volcanic ash, while nutrients for supporting the growth of the shoots are derived primarily from the roots, hydroponic solutions may be introduced into the growing media to supplement the nutritional supply. A complete hydroponic solution contains potassium, nitrate nitrogen, ammoniacal nitrogen, phosphorous, calcium, magnesium, iron, manganese, copper, zinc, boron, molybdenum, mixed together in an appropriate concentration.

The media is not discarded after harvesting, but is reused. Before the media is reused, it is preferably subjected to steam or chemical sterilization, for such sterilization kills disease organisms. The media may also consist of various formulations of peat moss, vermiculite, and hydrophilic and hydrophobic styrofoam.

The roots of Belgium endive are planted in the clean, sterile growing media so that there is no need to clean the shoots after they have been cut from the roots.

Chamber 11 is preferably thermally insulated so that its environment may be controlled with respect to relative humidity and temperature by a standard air-conditioning unit, within plus or minus three per cent. Throughout the entire forcing cycle, the relative humidity is held in the range of seventy percent to 85 percent, 80 percent being the optimum value. The growth of shoots is initially stimulated by starting the forcing cycle in the range of 70° F to 80° F for a period of a few days, just sufficient to bring about incipient growth. Then the temperature in the chamber is dropped to the range of 52° to 56° F, and the chamber is held within this range for the remainder of the forcing cycle. Should it be desireable to delay maturity for marketing reasons, the temperature can be reduced to about 35° F, thereby prolonging the forcing cycle.

Because the roots are planted in pallet boxes which are stacked one above the other, an entire stack may be handled with a fork-lift truck. In processing the pallet boxes, conveyor belts may be used to convey boxes, after planting, to a stacking station, and dumping equipment may be employed to dispose of roots after harvesting. Because no natural soil is employed, but reusable growing media, the entire process lends itself to automation techniques to minimize the need for manual operations.

Another approach to stacking of the pallets is to provide racks which are inclined to create a gravity chute arrangement to facilitate the ready removal of pallets without the need for fork lift trucks. In this arrangement, newly planted pallets are placed at the input or high end of the chutes, whereas pallets in condition for harvesting are discharged at the other or low end of the chutes.

It will be appreciated that because the forcing phase is independent of ambient conditions and may be carried out in any season of the year so that in winter the controlled-environment chamber is heated to attain the desired temperature range, and in summer it is cooled for the same purpose, the forcing phase may be carried out at any suitable site in any country. It no longer is seasonal or geographically limited to those countries whose environmental conditions are appropriate. Also, because all aspects of the forcing phase are controlled, the quality of the Belgium endive produced thereby is uniformly high and is not subject to the vagaries of varying natural conditions of temperature and humidity, nor is it responsive to the vicissitudes of natural soil conditions.

Some varieties of Cichorium intybus respond differently from others in respect to the "tightness" of the witloof itself. For some varieties it is necessary to give compression to the sterile media by placing in the pallet and on top of the media a piece of plywood, a metal sheet or some other plate imposing a uniform weight on the media. This weight then translates itself into a mild force on the media which in turn restrains the growing witloof. As a consequence, the witloof itself grows a "tighter" head and achieves a quality premium in the marketplace.

Other and newer varieties have an inherent ability to grow a 'tight' witloof without the need for an applied pressure. Still other varieties can grow a "tight" witloof whereby only the root need be placed in the sterile media to the depth of the root itself and the head grows with acceptable "tightness" without benefit of surrounding media or added weight on the surface of the media. But regardless of the botanical variations inherent to soil grown roots, the basic principles underlying the present invention are applicable to all available varieties.

While there has been shown and described preferred embodiments of a technique for producing Belgium endive in accordance with the invention, it will be appreciated that many changes and modifications may be made therein without, however, departing from the essential spirit thereof.

I claim:

1. The technique for forcing Belgium endive, comprising the steps of:
   A. planting endive roots in a growing medium contained in pallet boxes, said medium being constituted by sterilizable, reusable materials, said roots being planted in said growing medium so that they are flush with the surface thereof, said roots having been grown in the field, being dug up, and their tops removed prior to planting in said boxes;
   B. stacking said boxes one above the other in a dark chamber with sufficient headroom between boxes to afford space for air circulation and headroom for the growth of shoots; and
   C. regulating the environment of said chamber to maintain the relative humidity thereof in the range of about 70 percent to 85 percent throughout the course of the forcing cycle and to hold the temperature at the start of the forcing cycle in the range of about 70° to 80° F to stimulate the initial growth of shoots, the temperature for the balance of the cycle being reduced and then held in the range of about 50° to 56° F.

2. The technique as set forth in claim 1, further including the step of placing a plate over the roots in the growing media to impose a substantially uniform pressure thereon.

3. The technique as set forth in claim 1, wherein said stacked boxes are separated by removable legs to afford said space for air circulation.

4. The technique as set forth in claim 1, wherein said relative humidity is maintained at about 80 percent.

5. The technique as set forth in claim 1, wherein said chamber is thermally insulated, and said regulation is effected by an air-conditioner unit which functions to maintain the specified conditions of humidity and temperature in said chamber throughout the year, regardless of external conditions.

6. The technique as set forth in claim 1, wherein said boxes are stacked in multi-tier racks.

7. A technique as set forth in claim 1, wherein said materials include shredded polyurethane foam.

8. The technique as set forth in claim 7, further including the step of supplying a hydroponic solution to the media to supplement nutrients provided by the roots.

9. The technique for growing Belgium endive comprising the steps of:
   A. growing the roots of the endive in an open field;
   B. digging up the roots and planting them in a sterilizable, reusable growing medium in pallet boxes in a dark chamber, to effect forcing of the endive, said roots being planted in said growing medium so that they are flush with the surface thereof; and
   C. regulating the environment in said chamber to maintain the relative humidity thereof in the range of about 70 to 80 percent in the course of a forcing cycle while maintaining the temperature level thereof at the start of the forcing cycle in the range of about 70° to 80° F to stimulate the initial growth of shoots, the temperature thereafter being reduced to a level in the range of about 50° to 56° F and being held at the reduced level for the balance of the forcing cycle.

* * * * *